Figure 1:
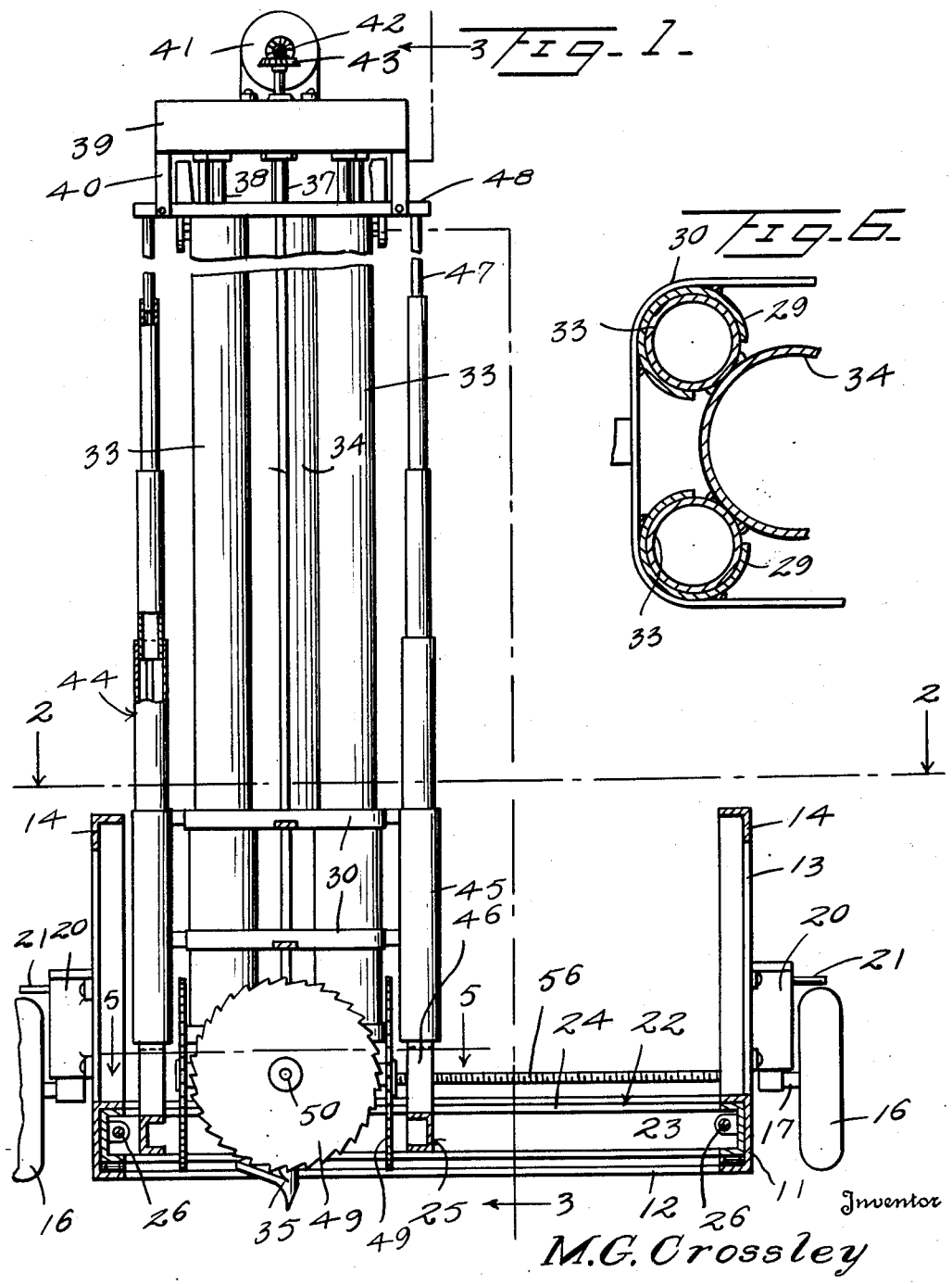

July 24, 1951  M. G. CROSSLEY  2,561,343
GRAVE DIGGER

Filed Aug. 5, 1948  5 Sheets-Sheet 1

Inventor
M. G. Crossley
By Kimmel & Crowell
Attys.

July 24, 1951 M. G. CROSSLEY 2,561,343
GRAVE DIGGER
Filed Aug. 5, 1948 5 Sheets-Sheet 4

Inventor
M. G. Crossley
By Kimmel & Crowell
Attys.

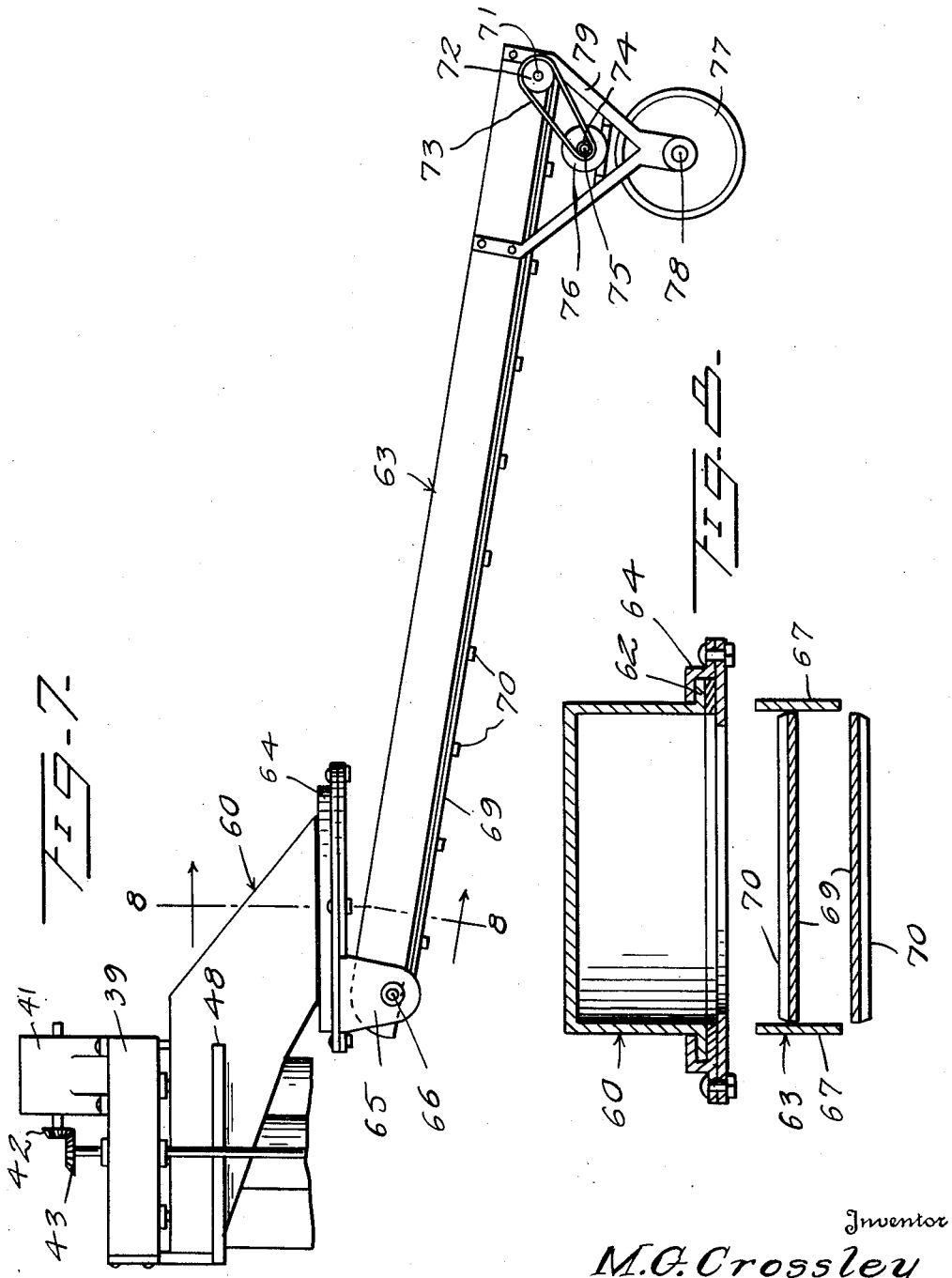

Patented July 24, 1951

2,561,343

UNITED STATES PATENT OFFICE 2,561,343

GRAVE DIGGER

Muryl G. Crossley, Oklahoma City, Okla.

Application August 5, 1948, Serial No. 42,720

5 Claims. (Cl. 255—21)

This invention relates to digging devices for forming an opening or recess in the ground.

An object of this invention is to provide a digging machine for making an opening, such as a grave opening, in the ground with the sides of the opening vertical and the walls right angularly related.

Another object of this invention is to provide a grave digger embodying a plurality of augers and hydraulic means for raising or lowering the augers, together with a conveyor for moving the dirt to a point laterally or at one end of the opening.

A further object of this invention is to provide a digger of this type embodying rotatable toothed cutters for squaring the hole so that a suitable retaining means may be inserted in the formed opening to prevent a cave-in of the walls.

A further object of this invention is to provide a digger of this type which will form a square opening, and the device includes means whereby the digger may be shifted laterally and longitudinally so that any desired width and length of opening may be formed.

With the above and other objects in view, my invention consists in the arrangement, combination and details of construction disclosed in the drawings and specification, and then more particularly pointed out in the appended claims.

Figure 2:
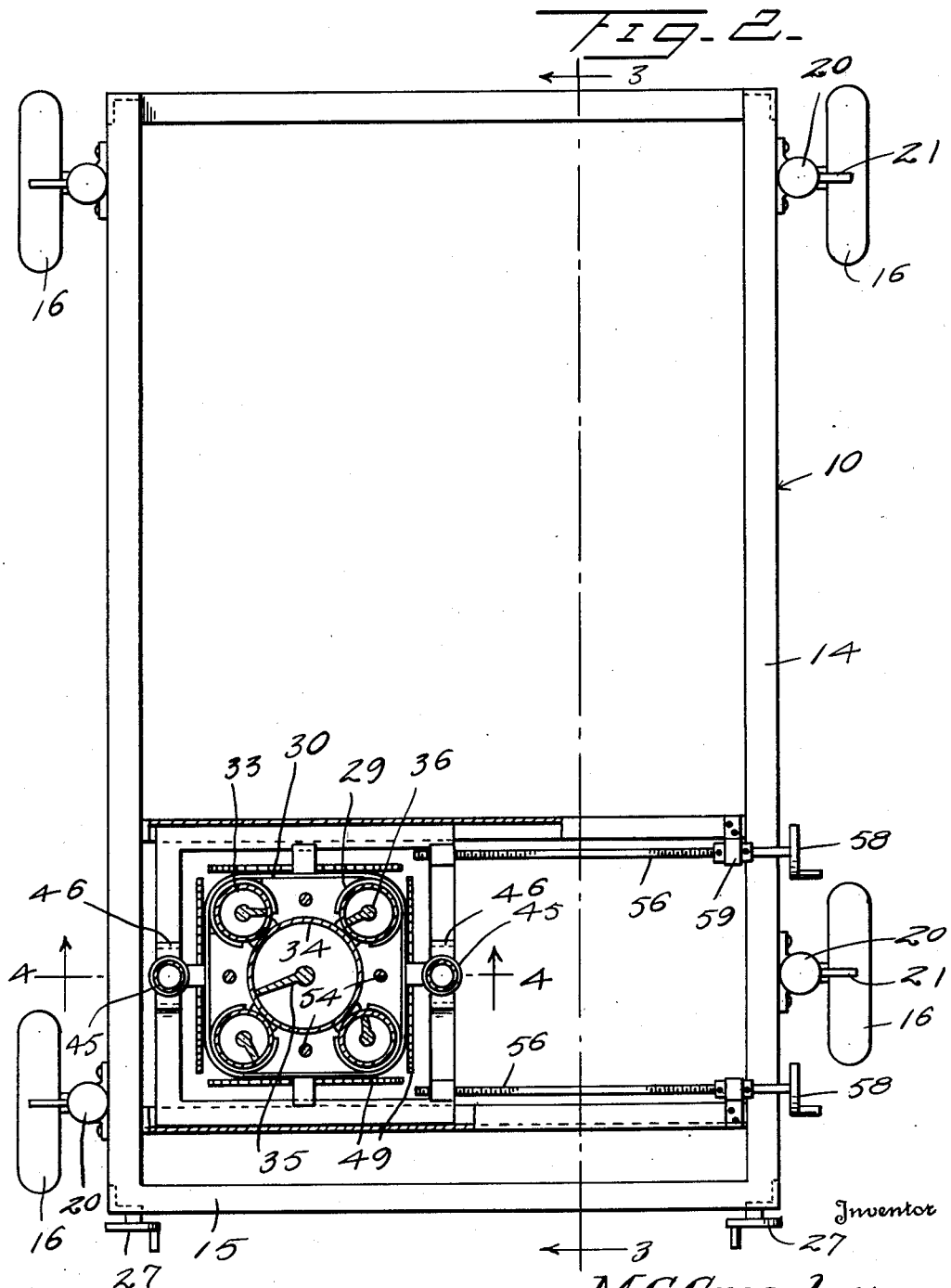
Figure 3:
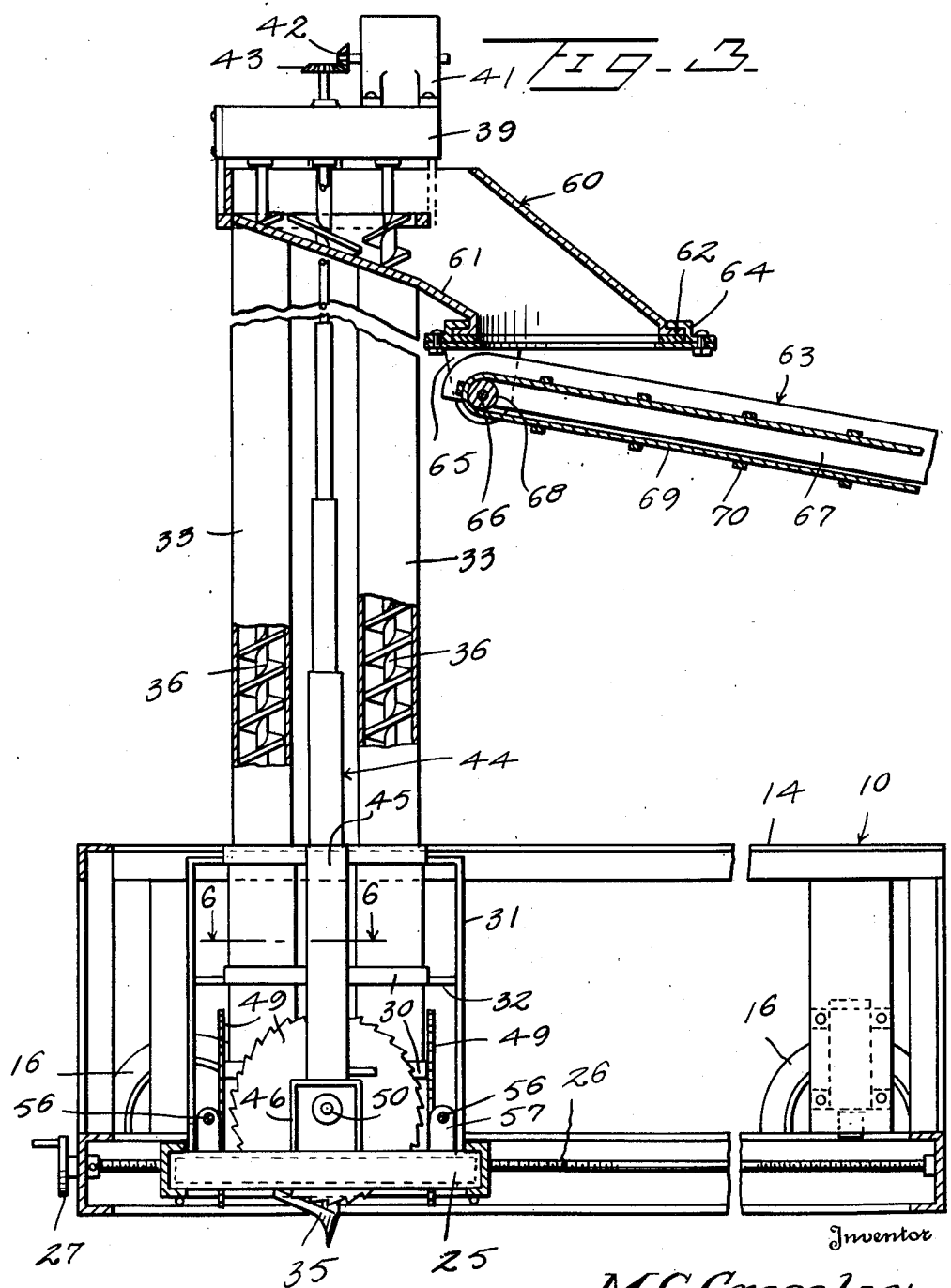
Figure 4:
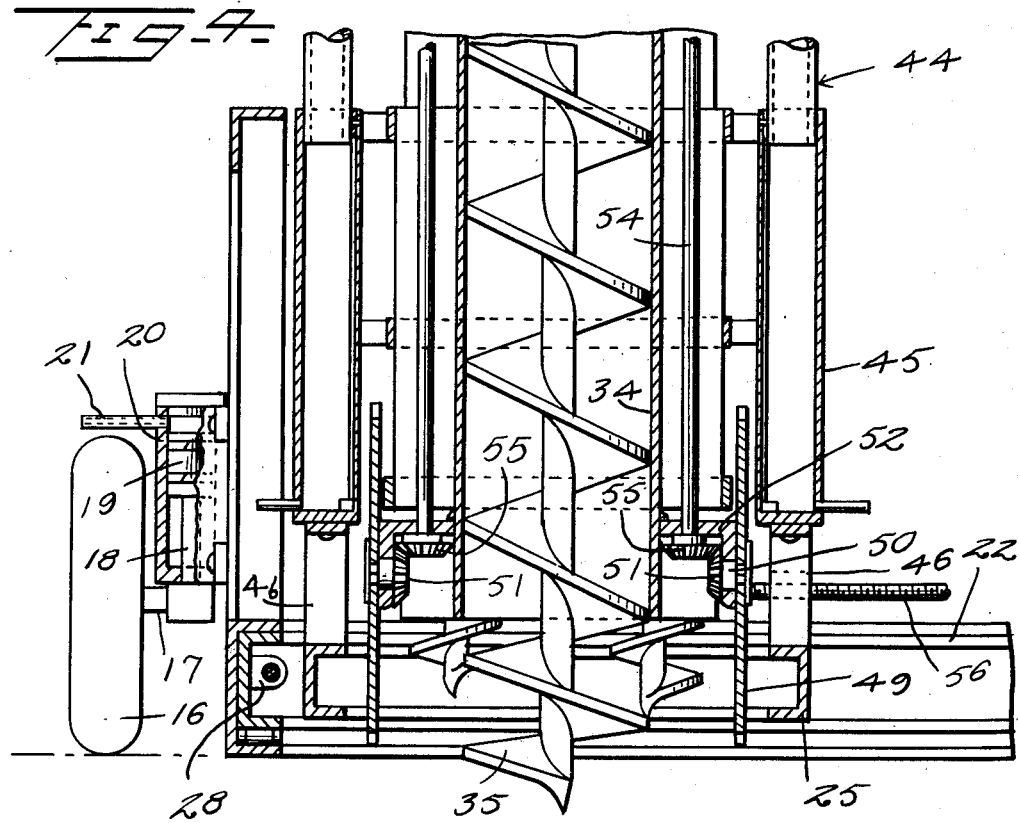
Figure 5:
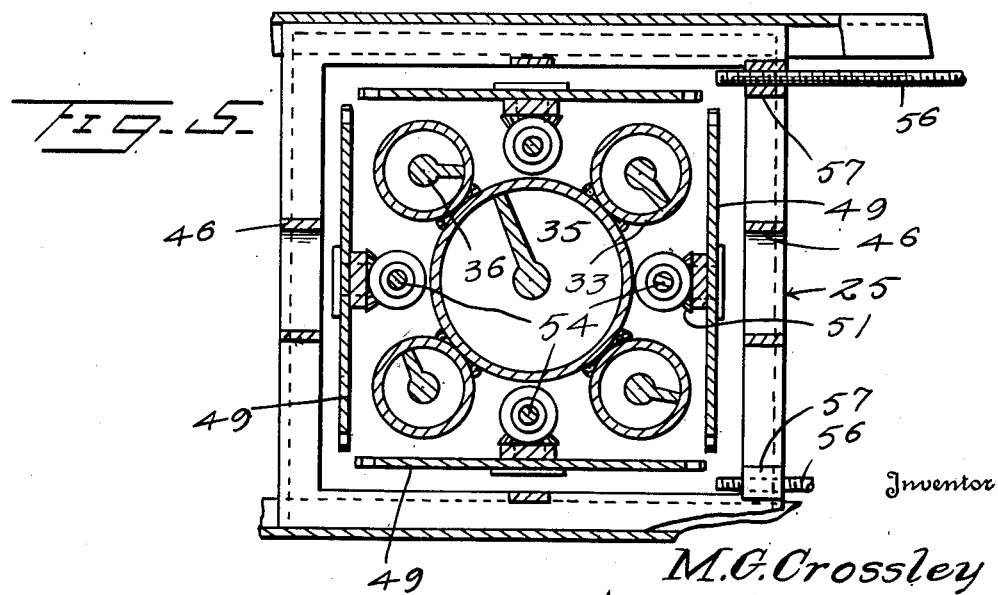

In the drawings,

Figure 1 is a detail side elevation partly in section of a grave digging machine constructed according to an embodiment of this invention, Figure 2 is a horizontal section taken substantially on the line 2—2 of Figure 1, Figure 3 is a sectional view taken substantially on the line 3—3 of Figure 1, Figure 4 is a fragmentary sectional view taken on the line 4—4 of Figure 2, Figure 5 is a fragmentary sectional view taken on the line 5—5 of Figure 1, Figure 6 is a fragmentary sectional view taken on the line 6—6 of Figure 3, Figure 7 is a detail side elevation partly broken away showing the upper portion of the device and the conveying means, Figure 8 is a sectional view taken on the line 8—8 of Figure 7.

Referring to the drawings the numeral 10 designates generally a frame structure which is formed of lower longitudinal channel members 11 and end channel members 12. The lower channel members 11 have secured adjacent the opposite ends thereof upright angle members 13, and a pair of longitudinal angle members 14 are secured to the upper ends of the angle members 13.

At one end of the frame 10 an upper transverse angle member 15 is connected between the upper ends of one pair of the uprights 13 and the adjacent ends of the longitudinal angle members 14. When the device is in digging position the frame 10 is adapted to rest on the surface of the ground. The frame 10 is, however, mobile and has secured thereto wheels 16 carried by spindles 17 which are secured to the lower ends of connecting rods 18 which are connected to pistons 19 slidable in hydraulic cylinders 20.

The cylinders 20 are adapted to be connected to a source of fluid pressure supply by means of a pipe 21. The channel members 14 have the channels thereof facing inwardly and form guides for a longitudinally movable main carriage generally designated as 22. The carriage 22 is formed of outer longitudinal channel members 23 and cross channel members 24, and latter forming guides for a second carriage generally designated as 25.

The main carriage 22 is adapted to be moved lengthwise of the frame by means of a pair of screw shafts 26 having hand wheels 27, and the carriage 22 has bearing brackets 28 fixed thereto through which the shafts 26 are threaded. The second carriage 25 constitutes a digger carrier and has fixed thereto a plurality of upstanding split tubular guide members 29. The guide members 29 are connected together by means of bands 30, and the guide members 29 are fixed relative to the second carriage 25 by means of upright supporting members 31 which are connected to the bands 30 by connecting bars 32.

As shown in Figure 2, there are four of these longitudinally split guide tubes 29 and vertically disposed screw housings 33 are slidable in the guide tubes 29. The screw or auger housings 33 are fixed to a centrally disposed cylindrical housing 34 within which a centrally disposed and main auger 35 is rotatably mounted. The housings 33 have rotatably mounted therein augers or spiral digging members 36 and these digging members 35 and 36 extend at their lower ends a slight distance below the housings 33 and 34 and the shafts 37 and 38 for the augers 35 and 36 extend above the upper ends of the housings 33 and 34 and are connected to a gear reducing means 39 supported above the housings 33 and 34 by supporting members 40.

A motor 41 is mounted on top of the gear housing 39 and is connected to the gear structure by means of beveled gears 42 and 43, as shown in Figure 1.

The digging means including the augers 35 and 36 is adapted to be vertically moved by means of telescoping hydraulic elevating means 44 including a lower hydraulic cylinder 45 supported by supporting means 46 from the digging carriage 25. The uppermost hydraulic elevating member 47 is connected to the top of the cylinders 33 and 34 by means of an upper connecting bar 48.

In order to provide for digging of a square hole, I have provided a plurality of right angularly related toothed digging wheels 49 mounted on stub shafts 50 which, as shown in Figure 4, have a beveled gear 51 on the inner ends thereof and the stub shaft 50 is journaled in a bearing bracket 52 of substantially L-shape which is fixed to the lower end portion of the central cylinder or housing 34. There is a vertically disposed shaft 54 for each digging wheel 49 which has a beveled gear 55 secured to the lower end thereof meshing with the beveled gear 51. The shaft 54 extends upwardly between pairs of the housings 33 on the outer side of the housing 34 and terminates in the gear housing 39 for operation thereby.

The carriage 25 is adapted to be adjusted transversely of the main carriage 22 by means of a pair of screw shafts 56 which are threaded through bearing brackets 57 carried by the carriage 25 and the adjusting shafts 56 extend across the main carriage 22 and have hand wheels 58 disposed on the outer side of the main frame 10. The screw shafts 56 are journaled through bearings 59 which are carried by the main carriage 22.

The digging cylinders for the auger housings 33 and 34 have secured to the upper ends thereof a chute 60 having an inclined lower wall 61 and formed with an annular flange 62. A conveyor structure generally designated as 63 is rotatably carried by the chute 60 and includes a flanged ring 64 which rotatably engages the flange 62 of the chute 60 and the ring 64 has fixed thereto a pair of depending ears 65 through which a conveyor shaft 66 rotatably engages. The conveyor structure 63 includes a longitudinal frame 67 and a rear roller 68 about which a conveyor belt 69 having crossed cleats 70 fixed thereto movably engages.

The belt 69 at its forward end engages about a forward roller carried by a drive shaft 71 having a drive pulley 72 fixed thereto and about which a driving belt 73 engages. The belt 73 also engages about a motor pulley 74 secured to a motor shaft 75 which is rotated by a motor 76. The forward end of the conveyor structure 63 has a pair of wheels 77 mounted thereon, the wheels 77 being secured to an axle 78 which extends between a pair of depending bracket members 79 which are fixed to the side frame members 67.

The motor 76 is secured between the bracket members 79 and positioned below the lower run of the conveyor belt 69. By providing a pair of wheels 77 at the forward or outer end of the conveyor structure, the conveyor is thereby made mobile and may move upwardly over the previously discharged dirt as the main carriage 22 is moved lengthwise of the frame 10. Furthermore, by providing the substantially universal connection between the inner end of the conveyor structure 63 and the chute 60, the digging means may be raised or lowered or may be shifted either laterally or longitudinally with the conveyor structure movable therewith.

In the use and operation of this device, the digging structure is moved to the desired location with the wheels 16 in an extended position so as to raise the frame 10 off of the ground. When the desired location is reached, the wheels 16 are raised thereby permitting the frame 10 to lie flat on the surface of the ground. The motor 41 will rotate the digging screws or augers 35 and 36 and at the same time will rotate the toothed digging wheels 49. As the augers dig into the ground the digging structure is lowered by means of the hydraulic elevating and lowering means 44. The dirt which is removed by the augers and which is loosened from the opposite side walls of the opening or hole is carried upwardly through the auger housings 33 and 34 and then discharged into the chute 60. The dirt entering the chute 60 will drop onto the upper run of the conveyor belt 69 which is moved lengthwise and outwardly so that the removed dirt will be discharged either at one end of the frame 10 or if desired may be discharged at a point laterally of the frame 10.

The digging means after digging a hole of desired depth may be shifted either laterally or lengthwise of the main frame so that the desired length or width of opening may be provided.

I do not mean to confine myself to the exact details of construction herein disclosed but claim all variations falling within the purview of the appended claims.

What I claim is:

1. A digger comprising a frame, a main carriage slidable lengthwise of said frame, means for adjusting said main carriage relative to said frame, a second carriage slidably carried by said main carriage and movable transversely of said frame, vertical guide means on said second carriage, spaced vertically slidable auger housings carried by said guide means, a central auger housing tangentially secured to said first mentioned housings and movable therewith, operating means connected to said housings and to said second carriage adapted to vertically adjust said housings relative to said frame, digging augers journalled in said housings and extending from the lower ends thereof, mounting brackets carried by the lower end of said central housing between said first mentioned housings, vertically disposed cutting discs rotatably mounted on said brackets, and driving means connected to said augers and to said cutting discs.

2. A digger comprising a frame, a main carriage slidably mounted on said frame and movable longitudinally thereof, a second carriage slidable upon said main carriage and movable transversely of said frame, vertically disposed inwardly opening split guide tubes extending upwardly from said second carriage, outer cylindrical auger housings slidable within said guide tubes, a central auger housing in surface contact with said outer housings and movable vertically therewith, the lower ends of said augers projecting below the bottom edges of said housings for vertically moving the latter, radially extending brackets carried by said central housing between said outer housings, cutting discs rotatable about horizontal axes journalled in said brackets, and driving means for said augers and said cutting discs.

3. A digger comprising a frame, a main carriage slidably mounted on said frame and movable longitudinally thereof, a second carriage slidable on said main carriage and movable transversely of said frame, four equally spaced apart inwardly opening vertical split guide tubes on said second carriage, an outer cylindrical auger housing slidable in each of said guide tubes, a central auger housing joined at the periphery thereof to said outer housings for vertical movement with the latter, augers rotatably disposed within said housings and movable vertically therewith, means connected to said housings and said second carriage for vertically moving said housings, radially extending brackets extending from the lower end of said central housing between said outer housings, a cutting disc journalled in each of said brackets for rotation about a horizontal axis, and driving means for said augers and said cutting discs.

4. A digger as set forth in claim 3 including connecting means at the top ends of said auger housings and wherein said means for procuring vertical movement of said housings includes vertically telescoping tubes interposed between said second carriage and said connecting means, and hydraulic means adapted to extend and retract said telescoping tubes.

5. A digger as set forth in claim 3, including a conveyor communicating with the upper ends of said housings and rockably connected thereto.

MURYL G. CROSSLEY.

REFERENCES CITED

The following references are of record in the file of this patent:

UNITED STATES PATENTS

| Number | Name | Date |
| --- | --- | --- |
| 969,897 | New | Sept. 13, 1910 |
| 1,113,277 | Zelenay | Oct. 13, 1914 |
| 1,288,685 | Rogers | Dec. 24, 1918 |
| 1,290,550 | Hardinage | Jan. 7, 1919 |
| 1,499,561 | Stefanich | July 1, 1924 |
| 1,866,037 | Heim et al. | July 5, 1932 |
| 2,197,989 | Tyler et al. | Apr. 23, 1940 |
| 2,334,830 | Mansfield | Nov. 23, 1943 |